July 14, 1970 C. L. CRABTREE ET AL 3,520,060
DENTAL X-RAY TEACHING AND TRAINING REPLICA
Filed July 1, 1969 3 Sheets-Sheet 1

INVENTORS
CLINTON LARRY CRABTREE,
RAY WARREN ALCOX &
WAYNE REYNOLD JAMESON

BY Browdy and Neimark
ATTORNEYS

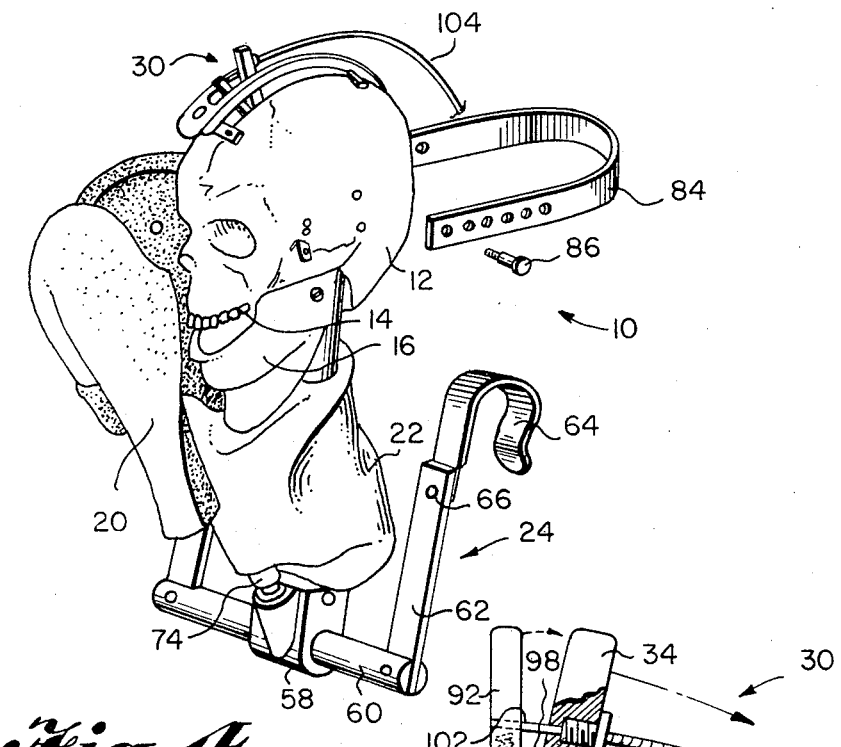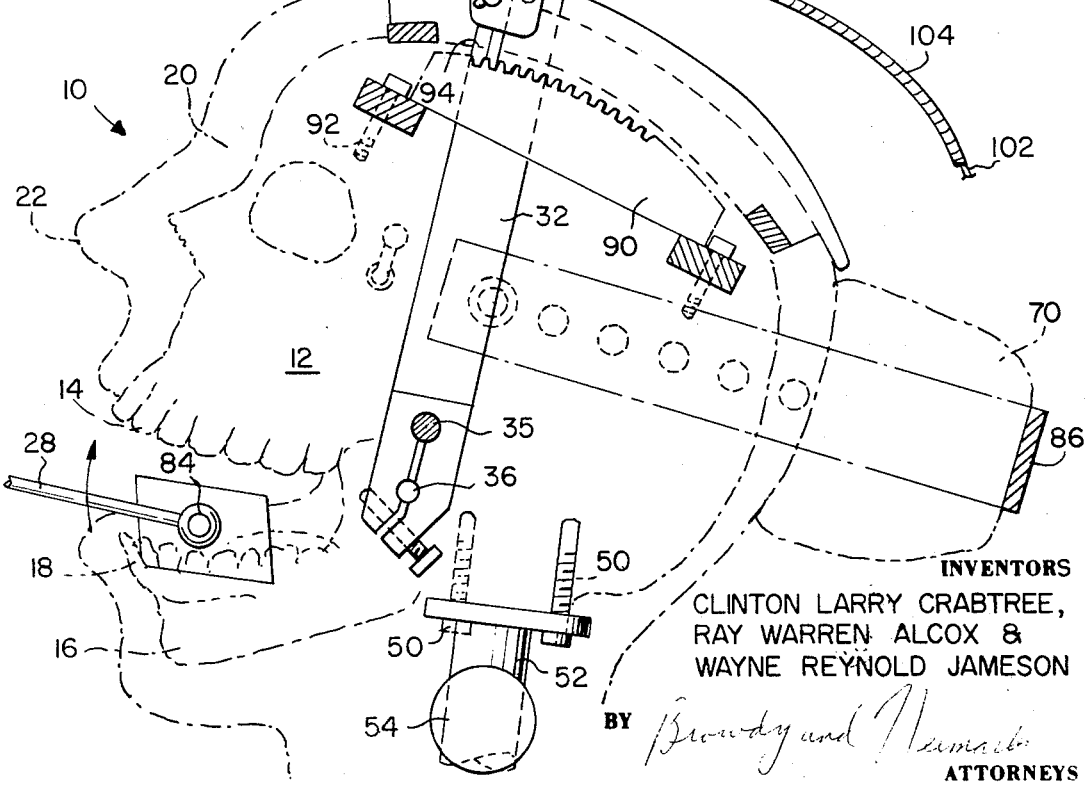

July 14, 1970   C. L. CRABTREE ET AL   3,520,060
DENTAL X-RAY TEACHING AND TRAINING REPLICA
Filed July 1, 1969   3 Sheets-Sheet 3
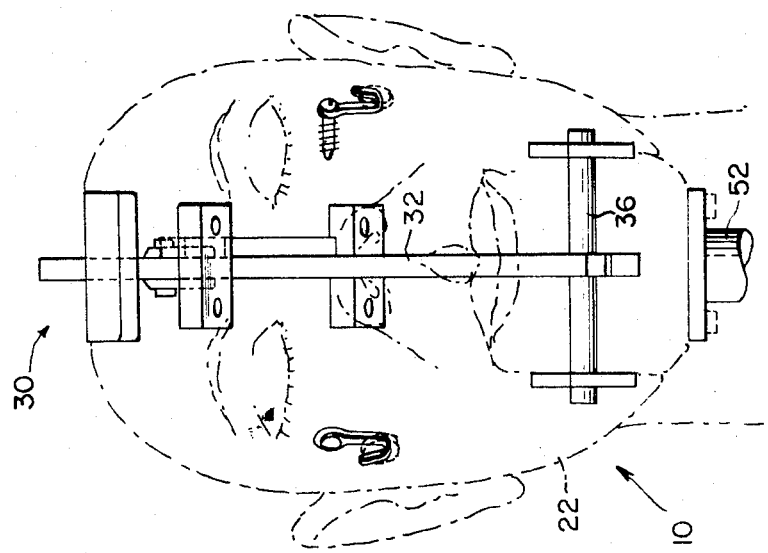
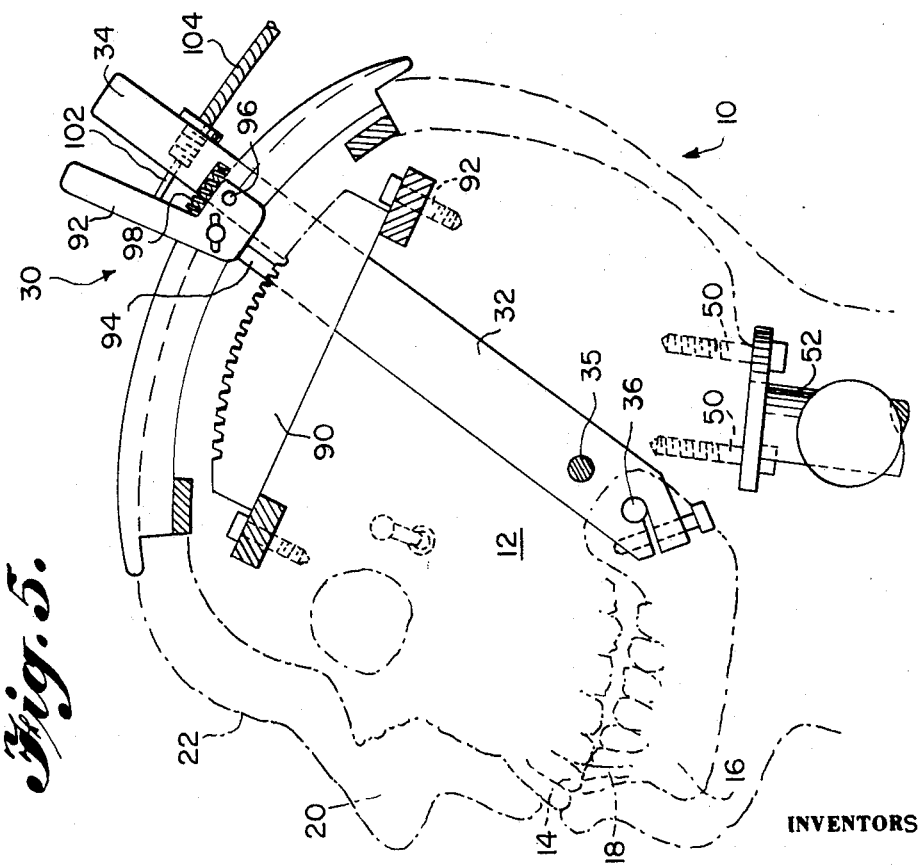
INVENTORS
CLINTON LARRY CRABTREE,
RAY WARREN ALCOX &
WAYNE REYNOLD JAMESON
BY *Brady and Neumark*
ATTORNEYS

United States Patent Office 3,520,060
Patented July 14, 1970

3,520,060
DENTAL X-RAY TEACHING AND TRAINING REPLICA
Clinton Larry Crabtree, Ray Warren Alcox, and Wayne Reynold Jameson, Rockville, Md., assignors to the United States of America as represented by the Secretary of the Department of Health, Education, and Welfare
Filed July 1, 1969, Ser. No. 838,206
Int. Cl. A61c 19/00
U.S. Cl. 32—71    4 Claims

ABSTRACT OF THE DISCLOSURE

A device is provided for teaching the technique of taking dental X-rays. The device comprises a natural human skull filled with a radio equivalent plastic and covered with rubber and plastic-foam sections to simulate a human head having correct external anatomical form. Pliable lips and cheeks and a soft, mobile tongue realistically reproduce the dental radiographic problem. The head is supported on a structure which hangs from the back of a dentist's chair; it can be adjusted for all angulations and may be strapped quickly and firmly to the head-rest of the chair.

---

The present invention relates to a dental X-ray teaching and training replica and, more particularly, to a manikin head simulating the natural human head, the mouth of which may be opened and closed, for the training of dental personnel in the use of oral roentgenology.

In the past it has been conventional for students of dental radiology to use each other in practicing radiographic techniques. Excessive exposure to X-rays being obviously undesirable, it has long been a desire to provide some form of artificial device upon which the practice of radiographic techniques could be satisfactorily carried out. This problem has, however, been substantial due to the character and complexity of the human mouth. It has also not been possible to use test animals for the same reason, i.e. the details of the mouth of most animals differs substantially from the human mouth, and additionally the taking of oral X-rays requires cooperation which test animals are unwilling or unable to provide.

Until the present invention, insofar as is known, only one moderately successful mechanical manikin had been developed for use in the teaching of oral roentgenology, and this was developed under Public Health Grant 86-65-82, and was first described in the May 1966 issue of PHS World. Unfortunately, this device, while establishing a satisfactory principle, had a number of practical defects among which were that the cheeks would not retract properly, the lips were very difficult to deflect or retract when opening the mouth for insertion of film, the device would not sit properly on all types of dental chairs and require clamping thereto and it was large and bulky, and the device required electrical power. These and other defects rendered the device unsatisfactory in operation.

It is, accordingly, an object of the present invention to overcome the deficiencies of the prior art, such as indicated above.

It is another object of the present invention to provide a highly satisfactory dental X-ray teaching and training replica.

It is another object of the present invention to eliminate the use of fellow students and other practice patients, thereby eliminating a source of unnecessary exposure to ionizing radiation, in the teaching of dental roentgenology.

It is another object of the present invention to permit an unlimited number of repeat exposures without danger of over-exposure in the training of personnel in dental X-ray technique.

It is another object of the present invention to anatomically and functionally simulate a human patient for the purpose of practicing dental X-ray techniques.

It is another object of the present invention to provide an improved dental X-ray training manikin which operates better and more efficiently, is easier to handle, is cheaper to construct, and is easier to carry.

It is another object of the present invention to meet the need for a life-like substitute patient for permitting unlimited oral radiography of all types without needless exposure to humans during teaching of such oral radiography techniques.

It is another object of the present invention to provide a radiographic training manikin which will attach simply and rapidly to any dental chair and which is adjustable with maximum simplicity to the entire range of radiographic positions.

It is another object of the present invention to provide a constant factor in the teaching of oral roentgenology so that the same oral X-ray can be taken repeatedly to clearly establish the relationship between technical factors and film quality and so that many similar views can be taken to illustrate the effects of various angles of projection and film placement, only student performance being a variable as between the patient and the radiographer.

These and other objects and the nature and advantages of the instant invention will be more apparent from the following detailed description of a specific embodiment which will so fully reveal the general nature of the invention that others can, by applying current knowledge, readily modify such specific embodiment and/or adapt it for various applications without departing from the generic concept; therefore, such adaptations and modifications should and are intended to be comprehended within the meaning and range of equivalents of such embodiment.

The disclosed embodiment generally consists of a selected human skull filled with radio-equivalent material and covered with additional material to simulate the size and shape of an average human head. It is used as a means to substitute for the live human skull in that dental X-ray films of the mouth of this manikin closely approximate those of a live human. The device has a means to lock the mouth open or closed or in any intermediate position. The covering material acts as a means to simulate the position of cheeks, lips and anatomical landmarks and as a means to simulate the resistance to movement in the case of the cheeks. The device also has a tongue which simulates the natural tongue in shape, placement and resiliency.

Additionally, the device has a means to unlock the mouth via either a foot pedal or a handle projecting from the head. There is a means to retain the head firmly in place and a means to swivel the head in any direction. In addition, the device has a simulated finger and an arm attached thereto for use in intra-oral film holding. The manikin is provided with a means for suspension from almost any chair back. It is easily used as a means to practice radiographic techniques using either the finger-holding method or by the use of film-holding devices.

The invention will be more apparent from the following description of the illustrated embodiment taken in conjunction with the accompanying drawings wherein;

FIG. 3 is a perspective view with the artificial flesh and skin pealed away from the skull;

FIG. 4 is a broken away side view of the disclosed embodiment with the mouth in open position;

FIG. 5 is a view similar to FIG. 4 with the mouth closed; and

FIG. 6 is a front view broken away to show internal elements.

Figure 1:
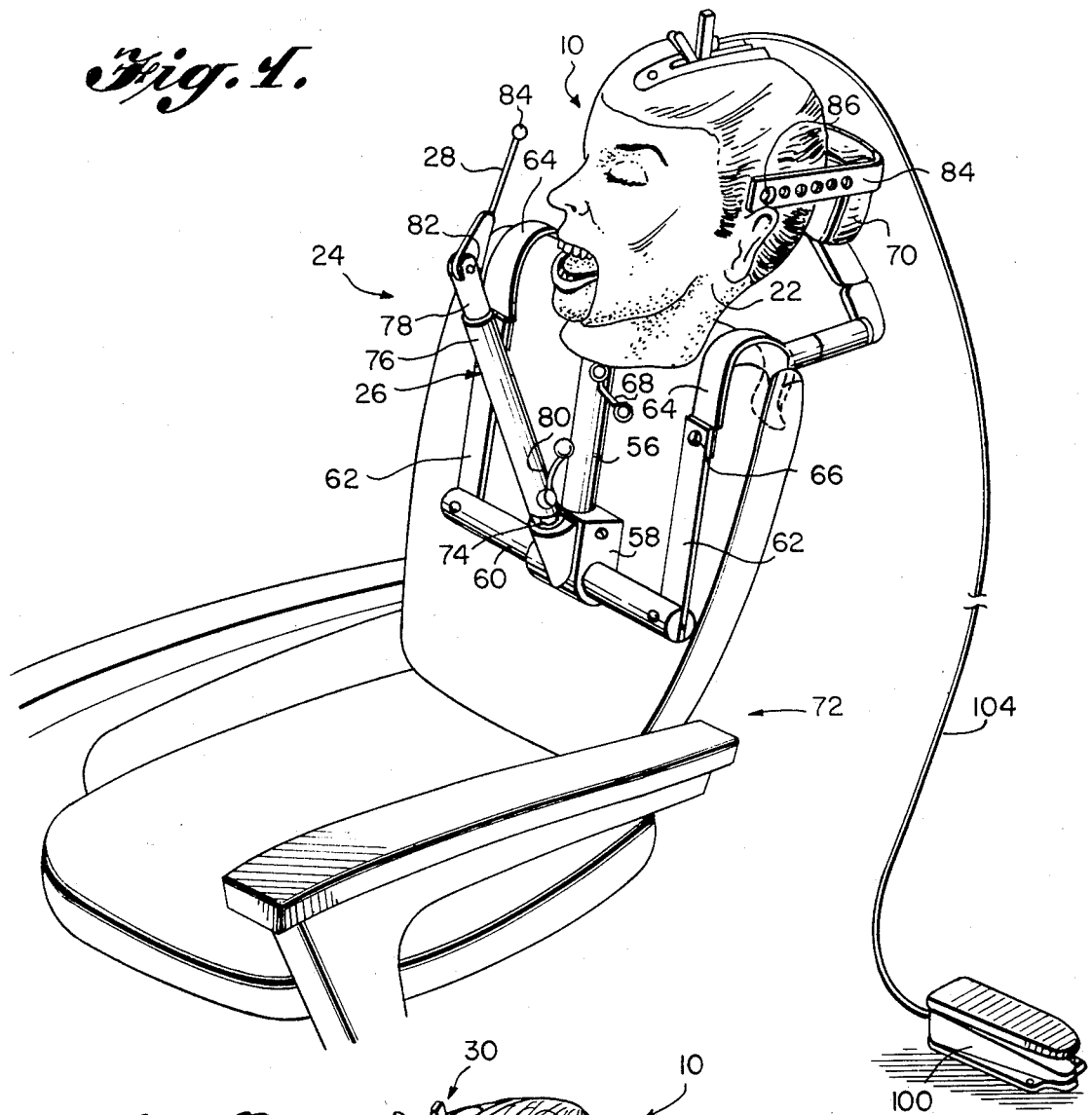
FIG. 1 is a perspective view of the illustrated embodiment of the device in position on a dentist's chair.

A manikin 10 in accordance with the present invention generally comprises a natural human skull 12 having an upper set of teeth 14 and a separate lower jaw 16 having teeth 18. The lower jaw 16 is suitably hinged for movement to the skull 12, such as described below. The skull 12 and the lower jaw 16 are covered with a plastic foam flesh 20 which is in turn covered with rubber skin 22. The skull 12 is mounted on a suitable support 24 having elements for attachment to the back of a dentist's chair. The support 24 carries an arm 26 which in turn carries a finger 28 which may be used to hold the film in place as shown in FIG. 4. Suitable means 30, shown best in FIGS. 4 and 5, are provided for opening and closing the mouth of the manikin 10.

In more detail, the manikin head 10 is intended to simulate an average-sized male head and preferably only natural skulls having a full complement of teeth are used in its manufacture. The skull 12 is preferably filled with a tissue-equivalent plastic (equivalent to tissue radiographically) such as isocyanate rubber. It is also desirable to protect the teeth 14 and 18 from loosening in use and this may be accomplished by coating the teeth with a radiolucent plastic composition; additionally, the molars are coated on the occlusal surfaces with a silocone rubber material for further protection.

The flesh 20 used to cover the skull 12 and to simulate the outer contours of a male human head comprises individually molded polyurethane portions as best seen in FIG. 3. In position, the foam flesh gives a natural and realistic feel which is helpful during radiographic training; in particular the lips and cheeks are quite pliable which gives a realistic radiographic environment both when the mouth is open and closed. The polyurethane flash comprises a radiolucent, light-weight, polyurethane foam.

The skin 22, which removably covers the polyurethane flesh 20, is formed of natural rubber latex and and has an elasticity comparable to human skin; this assists in providing a satisfactorily retractable cheek portion. The high strength, high stretch natural rubber latex is provided with suitable coloring in the desired areas, i.e. the hair portion is preferably painted externally with rubber paint, and the flesh tone in other areas is preferably imparted by the application of suitable inks to the inside of the skin, such ink being visible through the translucent amber-colored latex. The color on the inside is not subject to abrasion.

In addition to providing artificial flesh 20 and artificial skin 22, as described above, the manikin 10 is also provided with a sponge rubber latex tongue provided with internal pigmentation, and the floor of the mouth is also formed of sponge rubber. The provision of the foam flesh and latex skin maintains the lips below the incisal edges of the teeth whether the mouth is open or closed. Additionally, a thin section of tissue-equivalent isocyanate rubber is preferably provided below the mouth and serves to give mechanical stability under the chin when the mouth is opened.

The skull 12 is mounted, by means of suitable screws or bolts 50, to a first vertical rod 52 carrying a ball 54 on the end thereof. In turn, the ball 54 is carried in a suitable socket (not shown) at the upper end of a second vertical rod 56 which is initially coaxial with the first rod 52. The remainder of the support mechanism 24 constitutes a bracket 58 into which the bottom of the rod 56 extends, and a cross-bar 60 which passes through the bottom of the bracket 58, and upon which the bracket 58 may be rotated. Extending upwardly from the ends of the cross-bar 60 are a pair of hook holders 62, each of which carries at its upper end a suitable suspending hook 64.

The hooks 64 are preferably spring-steel and are coated with a protecting material such as vinyl plastic. These hooks 64 are mounted to the hook holders 62 by suitable nuts and bolts 66 so that the hooks may be removed and replaced by those of another size if necessary. A friction lock control lever 68 is provided along the vertical rod 56 for tightening or loosening the socket with respect to the ball 54, and this control, along with the rotation of the bracket 58 on the cross-bar 60, allows the manikin head to be brought back against the conventional head rest 70 of the dental chair 72. In addition, the ball joint 54 in the neck permits universal head angulation as is needed. Such construction easily hooks on the back of almost any chair quickly and the frame 24 is small and of light-weight, preferably being made of aluminum, although chrome-plated steel may also be used.

To assist maintaining the head in proper position against the conventional headrest 70, it has been found desirable to utilize a perforated rubber strap 86 or the like which passes about the back of the headrest 70 and connects to suitable brackets 86 on either side of the head.

Also extending from the bracket 58 by way of a ball and socket joint 74, controlled by a friction lock control lever 80, is the arm 26 which is formed of an outer tubular member 76 and an inner telescoping tubular member 78 with a rubber friction O-ring therebetween. The telescoping feature provides for arm length adjustment in the friction-loaded telescopic slide. At the end of the inner tubular member 78 is located a pivot 82 which passes through and anchors the finger 28. A small rubber ball 84 is provided on the end of the finger 28 to assist in holding the film as shown in FIG. 4. As with the support 24, the elements of the arm 26 and finger 28 are formed of aluminum or chrome plated steel.

As indicated above, the mouth of the manikin 10 may be opened and closed mechanically through suitable means 30. This is accomplished by providing a pivotable lever 32 which passes generally vertically inside the skull 12 and projects upwardly, in the form of a handle 34, through an elongated slot running from the frontal to the rear part of the top of the skull. The lever 32 is anchored to the skull by means of a horizontal pivot 35. The lower jaw 16 is connected to the bottom of the lever 32 by a suitable horizontal pin 36. As may be clearly seen by comparing FIGS. 4 and 5, when the handle 34 of the lever is pushed to the back of the skull, this forces the pin 36 forwardly and upwardly thereby closing the jaw; conversely, when the handle 34 is pushed forwardly, this causes rotation about the pivot 35 moving the pin 36 downwardly and backwardly thereby opening the mouth of the manikin.

In order to lock the mouth in either open or closed position, or for that matter in any intermediate position, a suitable locking and ratchet mechanism is also provided as part of the means 30. This locking and ratchet mechanism comprises an elongated rack 90 which is rigidly mounted by suitable mounting means, such as screws 92, within the skull 12 below the slot through which the lever 32 projects. For cooperation with such rack 90 is a locking handle 92 having a downwardly projecting element 94 which fits between a pair of adjacent teeth of the rack. The locking handle 92 is pivotally mounted to the handle 34 at a pivot 96 and is biased by a compression spring 98 so that the handle 92 is pivoted about the pivot 96 in a counterclockwise direction as viewed in FIGS. 4 and 5 so as to force the downward projection 94 into the teeth of the rack 90. To open or close the manikin mouth, one need only grasp the handles 34 and 92 between the fingers and squeeze against the compression spring 98 which causes the projection 94 to withdraw from the teeth of the rack 90 thereby permitting the lever 32 to be moved about the pivot 35. The elements of the means 30 may be formed of aluminum, chrome plated steel or plastic.

It is also preferred to provide an auxiliary operating mechanism which does not require use of the hands. Such an auxiliary mechanism may simply comprise a mechanically operating foot pedal 100 (see FIG. 1) which, upon depression, draws a cable 102 within a sheath 104 causing movement of the handle 92 toward the handle 34.

Figure 2:
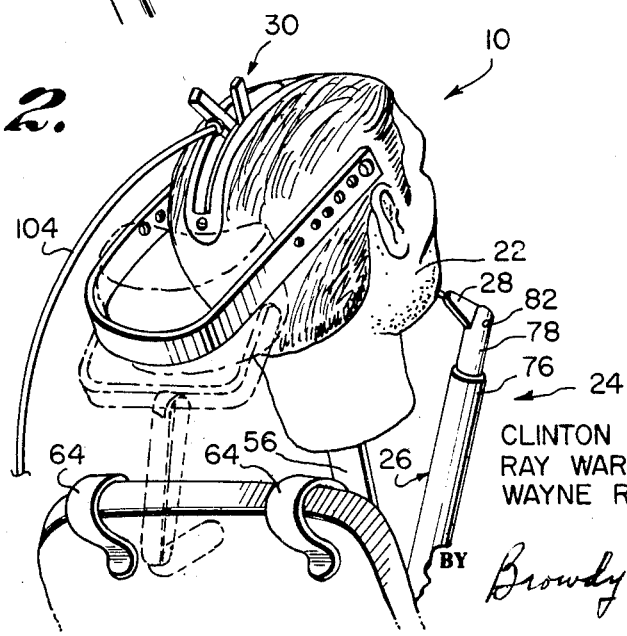
FIG. 2 is a rear perspective view.

While the operation of the manikin in accordance with the present invention will be quite apparent from its construction given above, nevertheless a brief description of the operation is given below. The manikin 10 is removed from a small shipping and storage case and is hung over the back of a dental chair such as is shown in FIGS. 1 and 2. The head and vertical column 56 are moved toward the back of the chair by pivotting the bracket 58 about the cross bar 60. For final adjustment in the seating of the manikin against the dental chair headrest 70, the locking lever 68 is displaced so that the head is free to rotate about the ball 54 of the ball and socket joint and the head is placed against such headrest, the locking of the joint by movement of lever 68 effecting clamping of the head against the headrest. The head strap 84 is then anchored to the head and placed about the headrest 70.

The mouth of the manikin is opened by squeezing the handles 92 and 34 together and moving the lever 32 forwardly to the position shown in FIG. 4. Upon release of the handles, the spring 98 automatically forces the locking element 94 into the teeth of the rack 90. The radiographic film is positioned by normal technique, since the tongue may be depressed or pushed aside and the corners of the mouth may be pulled away from the teeth as desired. Periapical film may be held in place by the finger 28 and the tip 84 as shown in FIG. 4, the arm 26 being moved into position by unlocking the clamping lever 80 at its base and relocking it in the desired position; the length of the arm being adjusted by simply pushing or pulling the upper telescoping member 78 in the lower member 76; and the finger angle being adjusted by rotating the finger 28 in the pivot 82, the ball tip 84 holding the film in position regardless of the finger angle. In those instances where the finger is not necessary, it is easily moved out of the position and the film is held in place by closing the mouth on a film-holding device to the position shown in FIG. 5.

It will be easily seen that all standard radiographic film, including occlusal film, can be positioned in a normal manner, the tongue, lips and cheeks being realistically pliable so that normal film positioning techniques are directly applicable.

It is understood that the invention is not limited to the embodiment disclosed which is illustratively offered and the modifications may be easily made without departing from the invention.

What is claimed is:
1. A dental X-ray teaching and training manikin comprising a human skull filled with a tissue-equivalent plastic and having an upper head portion and a lower jaw portion, said skull having mating teeth in said upper head and lower jaw portions:
   means to open and close the mouth of said manikin comprising a vertical lever inside said skull and pivotted thereto and projecting generally vertically upwardly through the top thereof, said lower jaw being connected to said lever slightly below the pivot of said rod to said skull, and means to move said lever about said pivot;
   plastic foam covering said skull to simulate flesh and elastic rubber skin covering said foam flesh;
   support means for said skull comprising a pair of hooks adapted to be placed over the back of a chair;
   an artifical arm having a finger thereon projecting from said support means and adapted for holding X-ray film in the open mouth of said manikin; and
   means to lock said mouth in open position and in closed position for closing onto and holding in place a film-holding device in said mouth.

2. A device in accordance with claim 1 wherein said support means comprises a first rod for supporting said skull, a second rod below said first rod and connected thereto with a ball and socket joint, a bracket supporting said second rod, a cross bar rotatably passing through said bracket, and one of said pair of hooks at each end of said cross bar for supporting said cross bar on the back of a chair.

3. A device in accordance with claim 1 wherein said arm comprises a pair of telescoping members the bottom one of which is connected to said support means with a ball and socket joint, and the top one of which pivotally supports said finger.

4. A device in accordance with claim 1 wherein said means to lock said mouth in open and closed positions comprises a rack within said skull, a locking element for cooperating with the teeth of said rack carried by said lever, means to bias said locking element into cooperation with said rack, and means to force said locking element away from said rack to permit movement of said lever.

References Cited

UNITED STATES PATENTS

| | | | |
|---|---|---|---|
| 2,103,058 | 12/1937 | Burtenshaw | 32—71 |
| 2,203,891 | 6/1940 | Burtenshaw | 32—71 |
| 2,576,569 | 11/1957 | Burtenshaw | 32—71 |

ROBERT PESHOCK, Primary Examiner